(No Model.) 4 Sheets—Sheet 1.

T. F. N. FINCH.
AXLE BOX.

No. 393,328. Patented Nov. 20, 1888.

Witnesses.

Inventor.
Thomas F. N. Finch,
By
Warren R. Perce
Atty.

(No Model.) 4 Sheets—Sheet 2.
T. F. N. FINCH.
AXLE BOX.
No. 393,328. Patented Nov. 20, 1888.
FIG. 5
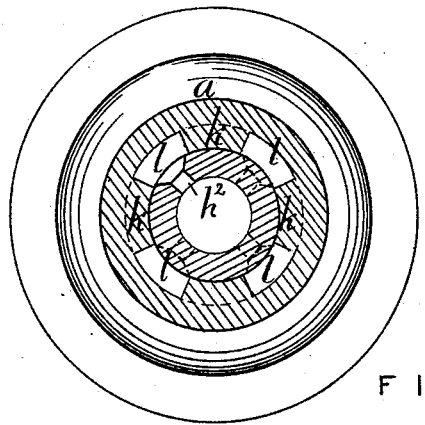
FIG. 6
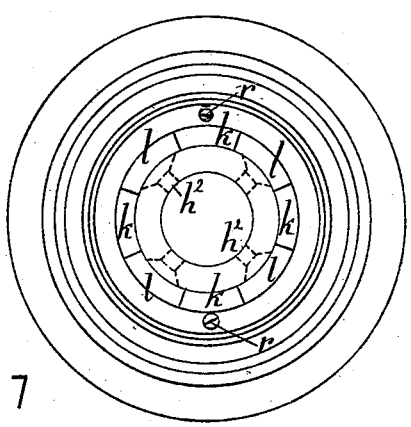
FIG. 7
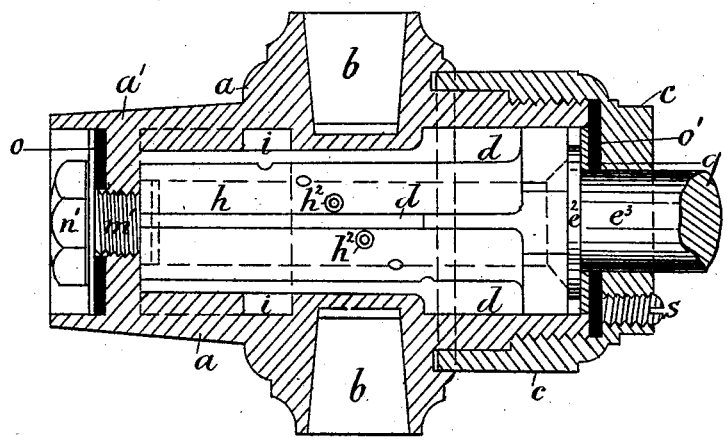
FIG. 8
FIG. 9
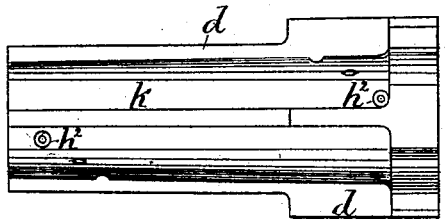
Witnesses.
Inventor:
Thomas F. N. Finch.
By Warren R. Perce
Atty.

(No Model.) 4 Sheets—Sheet 3.
T. F. N. FINCH.
AXLE BOX.
No. 393,328. Patented Nov. 20, 1888.
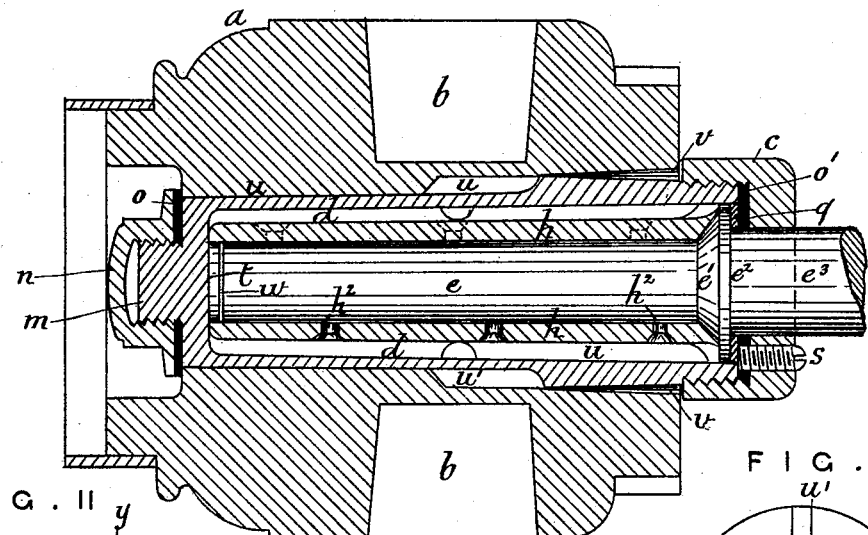
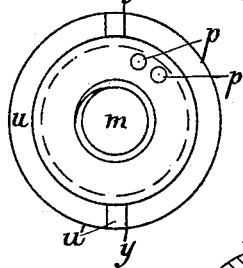
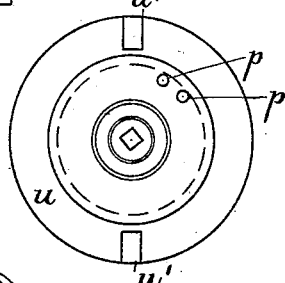
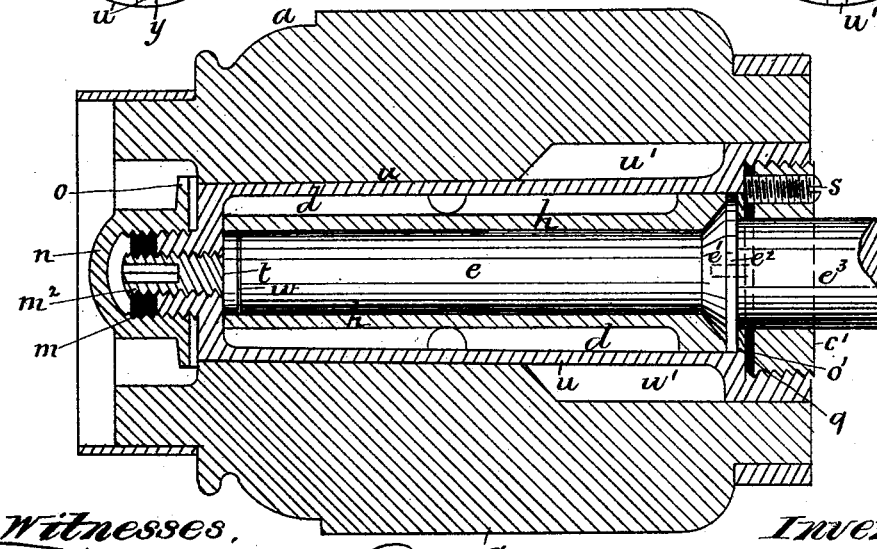
Witnesses, Inventor,
Thomas F. N. Finch,
By
Warren R. Perce
Atty.

(No Model.)　　　T. F. N. FINCH.　　4 Sheets—Sheet 4.
AXLE BOX.
No. 393,328.　　　　　Patented Nov. 20, 1888.
FIG. 14
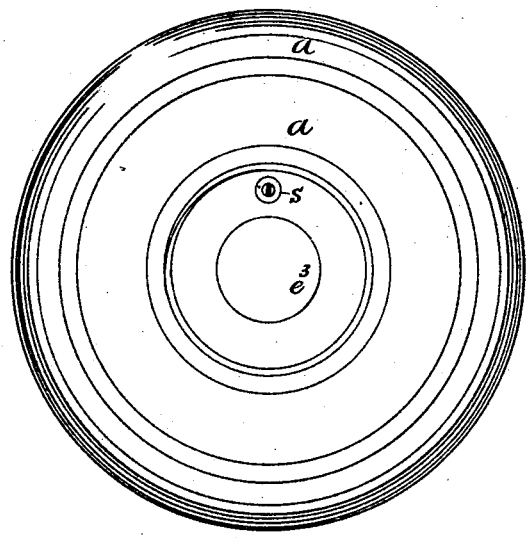
FIG. 16　　　　FIG. 15
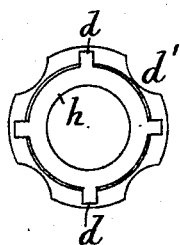 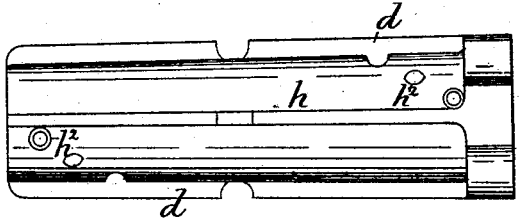
FIG. 17
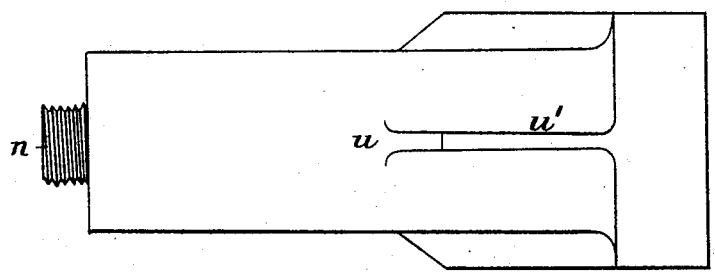
Witnesses,　　　　　Inventor,
　　　　　　　　　　Thomas F. N. Finch.
　　　　　　　By
　　　　　　　　Warren R. Perce
　　　　　　　　　　　Atty.

UNITED STATES PATENT OFFICE.

THOMAS FREEMAN NOTT FINCH, OF WORCESTER, COUNTY OF WORCESTER, ENGLAND.

AXLE-BOX.

SPECIFICATION forming part of Letters Patent No. 393,328, dated November 20, 1888.

Application filed December 16, 1887. Serial No. 258,137. (No model.) Patented in England July 15, 1887, No. 9,932.

*To all whom it may concern:*

Be it known that I, THOMAS FREEMAN NOTT FINCH, a subject of the Queen of Great Britain, residing at Sidbury Works, Worcester, in the county of Worcester, England, button-manufacturer, have invented certain new and useful improvements in the construction of the axles and axle-boxes for the wheels of common road-carriages and in the method of and means and appliances for lubricating the same, (for which I have obtained a patent in Great Britain, No. 9,932, bearing date July 15, 1887,) of which the following is a specification.

The objects of my invention are to strengthen the axles of wheels of road-vehicles, where strength is most required; to provide improved and expeditious means of lubricating the axles and boxes of such wheels, reducing the consumption of oil or other lubricants; to prevent the escape of oil or other lubricant from the boxes and the entry of dust and dirt into the same; to impart greater steadiness and stability to the wheels while running; to prevent oscillation or rocking of the wheel through the wearing away of the axle and box at the back of the same, and consequently preserving the frame-work of the vehicle from premature destruction, and to prevent the wear of the leather washer at the base of the hub.

I construct my improved hub and box of metal (preferably of malleable cast-iron) or partly of metal and partly of other suitable material.

In order that my said invention may be particularly described and ascertained, reference is hereby made to the accompanying drawings, in which similar letters of reference indicate corresponding parts.

Figure 1 is an elevation of a metallic hub constructed according to my invention. Fig. 2 is a view of the front end of the same. Fig. 3 is a back view. Fig. 4 is a longitudinal section. Fig. 5 is a section on the line $x\,x$ of Fig. 4. Fig. 6 is a view of the back end of the box with the cap $c$ removed. Fig. 7 is another sectional elevation of a metallic hub, showing another form of box $h$ and the axle in position in the hub. Fig. 8 is a separate view of the box $h$. Fig. 9 is a view of the front end of the same. Fig. 10 is a sectional elevation showing the method of adapting my invention to hubs formed of wood or other suitable material. Fig. 11 is a front view of the box. Fig. 12 is a sectional elevation showing another method of applying my invention to a wooden hub. Fig. 13 is a front view of the box with the cap $n$ removed. Fig. 14 is a back view of Fig. 12. Fig. 15 is an elevation of the internal box shown in Fig. 12. Fig. 16 is a front view of the same; and Fig. 17 is an elevation of the casing $g$, which is sometimes used to inclose the box.

Referring to Figs. 1 to 6, $a$ is the metallic hub. $b\,b$ are the sockets for the spokes. $h$ is the front portion of the box, and $h'$ is the back portion, the box being in this arrangement made in two halves and driven into the metallic hub. The hub is cast with ribs $k\,k$, leaving spaces for oil, $l\,l$, and is bored out to fit the box $h\,h'$. In Fig. 4 the box $h$ is shown in elevation and $h'$ in section, both being in position in the hub. $h^2\,h^2$ are holes formed in the box, whereby the oil contained in the annular space $i\,i$ and $l\,l$ can obtain access to the axle and circulate freely. $m$ is a screw at the front end of the box $h$, upon which the cap $n$ is fitted. $o$ is a leather washer, which is pressed against the face or flange $a'$ of the hub $a$. $p\,p$ (shown in dotted lines in Fig. 2) are two holes, one for pouring in the oil and the other for letting the air escape at the same time. When the washer $o$ and the cap $n$ are in position, as shown in Fig. 4, the holes $p\,p$ are covered and rendered perfectly oil and dust proof. $c$ is a cap at the back of the hub, the inside screw-thread of which fits a corresponding thread upon the hub. $o'\,o'$ is a leather washer forming an oil and dust proof joint. $q$ is a steel washer, which prevents the leather washer $o'$ being worn away. $r\,r$ are two grub-screws with chisel-heads. The leather washer being pressed upon these sharp chisel-heads, they enter the washer and prevent it from turning round in its place. A screw, $s$, is also fitted in the back plate of the cap $c$, as shown in Figs. 3, 7, 10, and 12. The inner end of this screw is hollowed out, whereby a sharp outer edge is formed, which enters the leather washer and prevents it from turning, and also acts as a set-screw to prevent the cap $c$ from unscrewing.

If preferred, the hub and the box may be cast in one, the chambers for the lubricant being cored out.

The front end of the axle $e$ is made cylindrical, as shown in Fig. 10. A conical enlargement, $e'$, and collar $e^2$ are formed next to the larger end of the axle $e^3$, the collar $e^2$ working against the steel washer $q$.

In forming the hub of metal the spaces or recesses $b\ b$ for the spokes are provided by coring or other means. Oil or other lubricant is poured into the chambers from the front end after removing the cap $n$ and washer $o$.

The wheel can be removed from the axle by first removing the screw $s$ from the back cap, $c$, and then unscrewing the cap $c$ with a "pin-spanner," the pin of which is inserted in the hole of the screw $s$, which at once releases the hub from the axle.

Fig. 7 is a sectional elevation of a metallic hub having the box $h$ formed in one piece. This box is furnished with longitudinal ribs $d\ d$ and flange $d'$, as shown in elevation in Fig. 8 and front view in Fig. 9. In this arrangement the ribs $d\ d$ fit the bore of the hub, and spaces for oil are thereby provided in addition to those between the ribs $k\ k$ and the annular space $i\ i$. $h^2\ h^2$ are holes formed in the box to allow free passage of the oil to the axle.

The screw $m'$ and head $n'$ in Fig. 7 are formed in one, the screw $m'$ passing through the face or flange $a'$ and pressing against the leather washer $t$, hereinafter mentioned.

Fig. 10 is a sectional elevation of a wooden hub. This is bored out, as shown, and fitted with a bush, $u$, which is driven in and held by wedges $v\ v$.

Fig. 11 is a front view of the bush $u$ with the cap $n$ and washer $o$ removed. $k\ k$ are flanges formed upon the box $h$. $h^2\ h^2$ are the holes for the passage of the oil.

Fig. 12 is a sectional elevation of another modification of the wooden hub; Fig. 13 being a front view of the bush $u$ with the cap $n$ and washer $o$ removed.

Fig. 14 is a back view of the hub.

Fig. 15 is a longitudinal elevation of the box $h$. Fig. 16 is a front view of the same, and Fig. 17 is a longitudinal elevation of the bush $u$.

In the modification comprised in Figs. 12 to 17 the cap $c'$ has a male screw which screws into a corresponding internal screw in the bush $u$, and a screw-plug, $m^2$, is fitted in the front end of the same.

Figure 1:
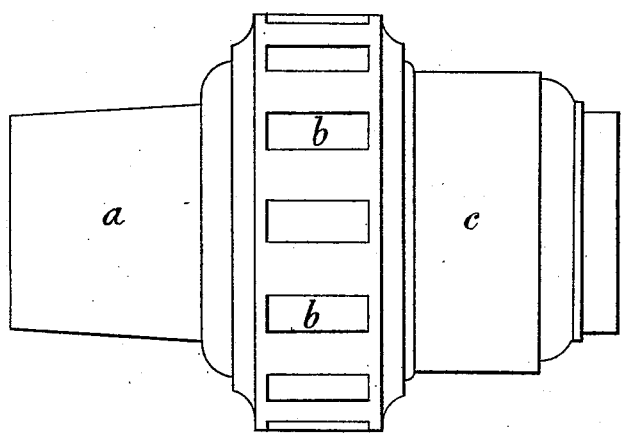
Figure 2:
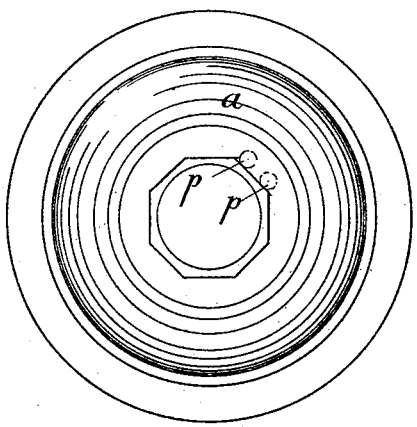
Figure 3:
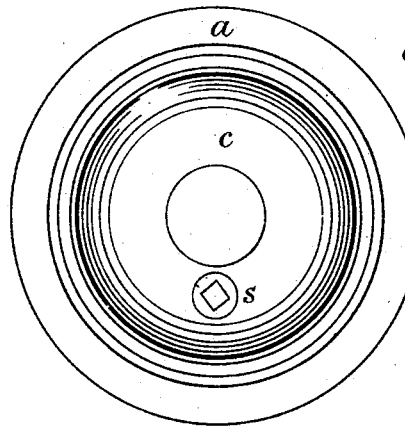
Figure 4:
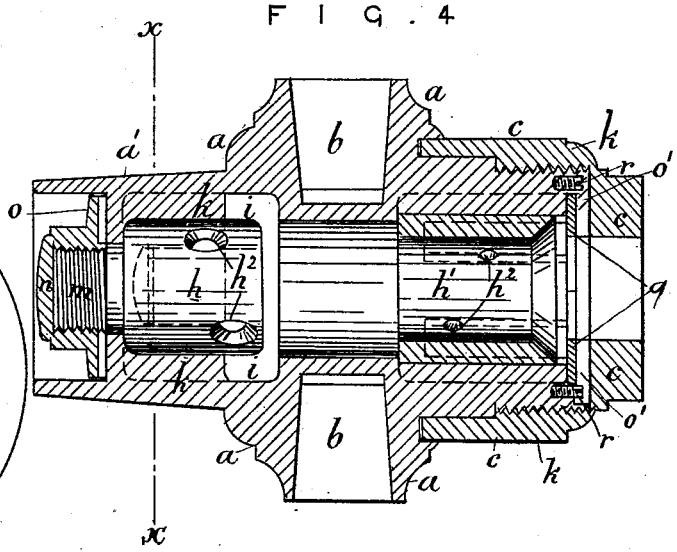

In Figs. 4 and 7 (in dotted lines) and in Figs. 10 and 12 (in full lines) the washers $t$ and $w$ are shown, $t$ being a leather washer, and $w$ a steel one. The washer $w$ protects the leather from wear, and the leather washer prevents noise, rattle, and vibration. The longitudinal tightening up is effected (see Figs. 4, 7, and 10) by means of the cap $c$. Referring to Fig. 12, the tightening is effected by means of the screw-plug $m^2$ or by that and the cap $c'$, or either of them. In some cases I keep the axle against the back washer by means of the screw-plug and leather washer described in my former English patent, No. 6,617 of 1884.

I claim—

1. In combination with a hub, the metallic box $h\ h'$, divided transversely in the middle, provided with ribs $d\ d$ and having holes $h^2$ to admit oil to the axle from the surrounding spaces, the portion $h$ having a screwed end, $m$, to receive the cap $n$, and the portion $h'$ being coned to fit the shoulder of the axle, substantially as specified.

2. In combination with a hub, the metallic box $h$, formed in one piece, provided with ribs $d\ d$ and oil-holes $h^2$ to admit oil to the axle, substantially as described.

3. In combination with a hub, the metallic bush $u$, carrying the metallic box $h$, such box having flanges $d\ d$, oil-holes $h^2$, and screwed end $m$ to receive the cap $n$, substantially as specified.

4. In combination with a hub, the metallic bush $u$, bored and tapped to receive the screwed plug $m^2$, the bush $u$ carrying the metallic box $h$, formed with ribs $d\ d$ and oil-holes $h^2$, substantially as specified.

5. In combination with a hub, the flange or face $a'$, having air and oil holes $p\ p$, substantially as described.

6. In combination with a hub, the screw-threaded cap $c$, the screw $s$, the leather washer $o'$, the steel washer $q$, and the chisel-ended grub-screw $r$, substantially as shown.

7. In combination with a hub, the washer $o$, and the flange $a'$, having the holes $p\ p$, substantially as specified.

In testimony whereof I have hereunto set my hand this 27th day of October, 1887.

THOMAS FREEMAN NOTT FINCH.

Witnesses:
O. G. BEARD,
   8 *Quality Court, London, W. C.*
WALTER J. SKERTEN,
   17 *Gracechurch Street, London, E. C.*